(12) United States Patent
Wittkopp et al.

(10) Patent No.: US 10,578,193 B2
(45) Date of Patent: Mar. 3, 2020

(54) MULTI-SPEED DUAL CLUTCH TRANSMISSION

(71) Applicant: GM Global Technology Operations LLC, Detroit, MI (US)

(72) Inventors: Scott H. Wittkopp, Ypsilanti, MI (US); Craig S. Ross, Ypsilanti, MI (US)

(73) Assignee: GM Global Technology Operaitons, LLC, Detroit, MI (US)

( * ) Notice: Subject to any disclaimer, the term of this patent is extended or adjusted under 35 U.S.C. 154(b) by 857 days.

(21) Appl. No.: 15/250,260

(22) Filed: Aug. 29, 2016

(65) Prior Publication Data

US 2016/0369869 A1 Dec. 22, 2016

Related U.S. Application Data

(62) Division of application No. 14/326,049, filed on Jul. 8, 2014, now Pat. No. 9,453,558.

(51) Int. Cl.
*F16H 3/00* (2006.01)
*F16H 3/093* (2006.01)

(52) U.S. Cl.
CPC ............. *F16H 3/093* (2013.01); *F16H 3/006* (2013.01); *F16H 2003/0931* (2013.01); *F16H 2003/0933* (2013.01); *F16H 2200/006* (2013.01); *F16H 2200/0052* (2013.01)

(58) Field of Classification Search
CPC .. F16H 3/006; F16H 2003/0931; F16H 3/091; F16H 47/02
USPC .................................. 74/330, 331, 333, 340
See application file for complete search history.

(56) References Cited

U.S. PATENT DOCUMENTS

| | | |
|---|---|---|
| 7,837,589 B2 | 11/2010 | Earhart |
| 7,896,770 B2 | 3/2011 | Earhart et al. |
| 7,963,191 B2 | 6/2011 | Holmes |
| 8,070,649 B2 | 12/2011 | Holmes |
| 8,104,367 B2 | 1/2012 | Singh |
| 8,191,441 B2 | 6/2012 | Holmes |
| 8,424,404 B2 | 4/2013 | Ross et al. |
| 8,438,941 B2 | 5/2013 | Mellet et al. |
| 8,464,599 B2 | 6/2013 | Ross et al. |
| 8,495,926 B2 | 7/2013 | Mellet |
| 8,499,656 B2 | 8/2013 | Ross et al. |
| 8,534,150 B2 | 9/2013 | Mellet et al. |
| 8,635,924 B2 | 1/2014 | Singh et al. |
| 8,733,194 B2 | 5/2014 | Mellet et al. |
| 8,739,644 B2 | 6/2014 | Singh et al. |
| 8,757,021 B2 | 6/2014 | Singh et al. |

(Continued)

OTHER PUBLICATIONS

U.S. Appl. No. 14/940,962, filed Nov. 13, 2015, by Tejinder Singh. All pages.

*Primary Examiner* — Ha Dinh Ho
(74) *Attorney, Agent, or Firm* — Vivacqua Law, PLLC

(57) ABSTRACT

A transmission is connectable to an input member and includes an output transfer gear, first and second transmission input shaft members, first, second, and third countershaft members, first and second sleeve shafts, a plurality of co-planar gear sets, and a plurality of torque transmitting devices. The torque transmitting devices include a plurality of gears, synchronizer assemblies and a dual clutch assembly. The transmission is operable to provide at least one reverse speed ratio and a plurality of forward speed ratios between the input member and the output member.

20 Claims, 2 Drawing Sheets

(56) References Cited

U.S. PATENT DOCUMENTS

| | | | | |
|---|---|---|---|---|
| 2012/0272761 A1* | 11/2012 | Mellet | .................... | F16H 3/006 74/331 |
| 2013/0031990 A1* | 2/2013 | Singh | ..................... | F16H 3/006 74/330 |
| 2014/0260738 A1* | 9/2014 | Phillips | .................. | F16H 3/006 74/330 |

* cited by examiner

| Gear State | Gear Ratio | Ratio Step | Torque Transmsitting Elements | | | | | | |
|---|---|---|---|---|---|---|---|---|---|
| | | | 36 | 38 | 158 | 154 | 156 | 152 | 150 |
| Rev | -10.850 | | X | | X | | | | X |
| N | | -0.75 | | | | | | | |
| 1st | 14.467 | | X | | | | X | | X |
| 2nd | 8.400 | 1.72 | | X | | X | | | X |
| 3rd | 6.300 | 1.33 | X | | | X | | | X |
| 4th | 4.000 | 1.58 | | X | | X | | X | |
| 5th | 3.000 | 1.33 | X | | | | X | X | |
| 6th | 1.742 | 1.72 | | X | | | X | X | |

X = On - Engaged Carrying Torque

| Gear State | Gear Ratio | Ratio Step | Torque Tranmsitting Elements | | | | | | | |
|---|---|---|---|---|---|---|---|---|---|---|
| | | | 36 | 38 | 160 | 154 | 156 | 162 | 152 | 150 |
| Rev | -5.6 | | | X | | | | X | X | |
| | | -0.38 | | | | | | | | |
| 1st | 14.7 | | X | | | | X | | | X |
| 2nd | 10.1 | 1.45 | | X | | | X | | | X |
| 3rd | 8.82 | 1.14 | X | | | | X | | | X |
| 4th | 6.44 | 1.37 | | X | X | | | | X | |
| 5th | 5.04 | 1.28 | X | | X | | | | | X |
| 6th | 3.68 | 1.37 | | X | | X | | | X | |
| 7th | 3.22 | 1.14 | X | | | X | | | X | |
| 8th | 1.25 | 1.45 | | X | | | X | | X | |

X = On - Engaged Carrying Torque

MULTI-SPEED DUAL CLUTCH TRANSMISSION

CROSS-REFERENCE TO RELATED APPLICATIONS

This application is a divisional of U.S. Non-Provisional application Ser. No. 14/326,049 filed on Jul. 8, 2014. The disclosure of the above application is incorporated herein by reference.

TECHNICAL FIELD

The present disclosure relates to transmissions and more particularly to a compact, dual clutch multiple speed transmission having countershafts and sleeve shafts to establish six or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

In one aspect of the present invention, a transmission includes a transmission housing. The transmission further includes a dual clutch assembly having a first clutch, a second clutch and a clutch housing connectable to an engine output member, and the clutch housing is rotationally supported within the transmission housing. The transmission further includes a first, second, third, fourth, fifth and sixth gear set. The first gear set includes a first gear in mesh with a second gear. The second gear set includes a first gear in mesh with a second gear and the second gear is in mesh with a third gear. The third gear set includes a first gear in mesh with a second gear and the second gear is in mesh with a third gear. The fourth gear set includes a first gear in mesh with a second gear and a third gear. The fifth gear set includes a first gear in mesh with a second gear and the sixth gear set includes a first gear in mesh with a second gear. The transmission further includes a first transmission input member rotatably supported in the transmission housing and the first gear of the second gear set is rotatably fixed for common rotation with the first transmission input member and the selective engagement of the first clutch of the dual clutch assembly transfers torque from the clutch housing to the first transmission input member. The transmission further includes a second transmission input member rotatably supported in the transmission housing. The first gear of the third gear set is rotatably fixed for common rotation with the second transmission input member. The second transmission input member is concentric with the first transmission input member and at least partially overlaps the first transmission input member. The selective engagement of the second clutch of the dual clutch assembly transfers torque from the clutch housing to the second transmission input member. The transmission further includes a first countershaft rotatably supported within the transmission housing and spaced apart from and parallel with the first and second transmission input members. The first gear of the first gear set is fixed for common rotation with the first countershaft. The transmission further includes a second countershaft rotatably supported within the transmission housing and spaced apart from and parallel with the first and second transmission input members. The second gear of the first gear set and the third gear of the fourth gear set are each fixed for common rotation with the second countershaft. The transmission further includes a third countershaft rotatably supported within the transmission housing and spaced apart from and parallel with the first and second transmission input members. The second gear of the fifth gear set is fixed for common rotation with the third countershaft. The transmission further includes a first countershaft transfer gear selectively connectable to the first countershaft for common rotation with the first countershaft. The transmission further includes a second countershaft transfer gear selectively connectable to the third countershaft for common rotation with the third countershaft. The first and second countershaft transfer gears transfer torque to a transmission output member. The transmission further includes a first sleeve shaft rotatably supported in the transmission housing and at least partially overlaps the first countershaft. The second gear of the second gear set and the first gear of the fifth gear set are rotatably fixed for common rotation with the first sleeve shaft, and wherein the second gear of the sixth gear set is selectively connectable for common rotation with the first sleeve shaft. The transmission further includes a second sleeve shaft rotatably supported in the transmission housing and at least partially overlaps the first sleeve. The second gear of the third gear set and the second gear of the fourth gear set are rotatably fixed for common rotation with the second sleeve shaft. The transmission further includes six synchronizer assemblies for selectively coupling at least one of gears of the six gear sets with at least one other of gears of the six gear sets, at least one of the sleeve shafts and the first, second and third countershafts, and the selective engagement of the first and second clutches of the dual clutch assembly interconnects the dual clutch housing with at least one of the first and the second transmission input members and the selective engagement of at least one of the six synchronizer assemblies establishes at least one of a plurality of forward and reverse speed ratios.

In another aspect of the present invention a first of the six synchronizer assemblies selectively connects the first countershaft transfer gear to the first countershaft.

In another aspect of the present invention a second of the six synchronizer assemblies selectively connects the second countershaft transfer gear to the third countershaft.

In another aspect of the present invention a third of the six synchronizer assemblies selectively connects the second gear of the third gear set to the first sleeve shaft.

In another aspect of the present invention a fourth of the six synchronizer assemblies selectively connects the third gear of the second gear set to third gear of the third gear set.

In another aspect of the present invention a fifth of the six synchronizer assemblies selectively connects the second gear of the sixth gear set to the first sleeve shaft.

In another aspect of the present invention a sixth of the six synchronizer assemblies selectively connects the second countershaft to the third countershaft.

In another aspect of the present invention the fifth gear set is adjacent the dual clutch assembly, the sixth gear set is adjacent the fifth gear set, the fourth gear set is adjacent the sixth gear set, the third gear set is adjacent the fourth fifth gear set, the second gear set is adjacent the third gear set and the first gear set is disposed between the second gear set and an end wall of the transmission housing.

In another aspect of the present invention the six synchronizer assemblies includes a first synchronizer assembly for selectively connecting the first countershaft transfer gear to the first countershaft and a fourth synchronizer assembly for selectively connecting the third of the second gear set to the third of the third gear set to establish a first gear ratio when the first clutch of the dual clutch is engaged to connect the dual clutch housing to the first transmission input member.

In another aspect of the present invention the six synchronizer assemblies includes a first synchronizer assembly for selectively connecting the first countershaft transfer gear to the first countershaft and a third synchronizer assembly for selectively connecting the second gear of the second gear set to second gear of the third gear set to establish a second gear ratio when the second clutch of the dual clutch is engaged to connect the dual clutch housing to the second transmission input member.

In another aspect of the present invention the six synchronizer assemblies includes a first synchronizer assembly for selectively connecting the first countershaft transfer gear to the first countershaft and a third synchronizer assembly for selectively connecting the second gear of the second gear set to second gear of the third gear set to establish a third gear ratio when the first clutch of the dual clutch is engaged to connect the dual clutch housing to the first transmission input member.

In another aspect of the present invention the six synchronizer assemblies includes a second synchronizer assembly for selectively connecting the second countershaft transfer gear to the third countershaft and a fifth synchronizer assembly for selectively connecting the second gear of the sixth gear set to first gear of the fifth gear set to establish a fourth gear ratio when the second clutch of the dual clutch is engaged to connect the dual clutch housing to the first transmission input member.

In another aspect of the present invention the six synchronizer assemblies includes a first synchronizer assembly for selectively connecting the first countershaft transfer gear to the first countershaft and a fifth synchronizer assembly for selectively connecting the second gear of the sixth gear set to the second gear of the first gear set to establish a fifth gear ratio when the first clutch of the dual clutch is engaged to connect the dual clutch housing to the first transmission input member.

In another aspect of the present invention the six synchronizer assemblies includes a second synchronizer assembly for selectively connecting the second countershaft transfer gear to the third countershaft and a third synchronizer assembly for selectively connecting the second gear of the second gear set to the second gear of the third gear set to establish a sixth gear ratio when the second clutch of the dual clutch is engaged to connect the dual clutch housing to the first transmission input member.

In another aspect of the present invention the six synchronizer assemblies includes a second synchronizer assembly for selectively connecting the second countershaft transfer gear to the third countershaft and a fifth synchronizer assembly for selectively connecting the second gear of the sixth gear set to the first gear of the fifth gear set to establish a seventh gear ratio when the first clutch of the dual clutch is engaged to connect the dual clutch housing to the first transmission input member.

In another aspect of the present invention the six synchronizer assemblies includes a second synchronizer assembly for selectively connecting the second countershaft transfer gear to the third countershaft and a fourth synchronizer assembly for selectively connecting the third gear of the second gear set to the third gear of the third gear set to establish an eighth gear ratio when the second clutch of the dual clutch is engaged to connect the dual clutch housing to the first transmission input member.

In another aspect of the present invention the six synchronizer assemblies includes a second synchronizer assembly for selectively connecting the second countershaft transfer gear to the third countershaft and a sixth synchronizer assembly for selectively connecting the second countershaft to the third countershaft to establish a reverse gear ratio when the second clutch of the dual clutch is engaged to connect the dual clutch housing to the first transmission input member.

In another aspect of the present invention a transmission includes a transmission housing. The transmission further includes a dual clutch assembly having a first clutch, a second clutch and a clutch housing connectable to an engine output member. The clutch housing is rotationally supported within the transmission housing. The transmission further includes a first, second, third, fourth, fifth and sixth gear set. The first gear set includes a first gear in mesh with a second gear. The second gear set includes a first gear in mesh with a second gear and the second gear is in mesh with a third gear. The third gear set includes a first gear in mesh with a second gear and the second gear is in mesh with a third gear. The fourth gear set includes a first gear in mesh with a second gear and a third gear. The fifth gear set includes a first gear in mesh with a second gear and the sixth gear set includes a first gear in mesh with a second gear. The transmission further includes a first transmission input member rotatably supported in the transmission housing and the first gear of the second gear set is rotatably fixed for common rotation with the first transmission input member and the selective engagement of the first clutch of the dual clutch assembly transfers torque from the clutch housing to the first transmission input member. The transmission further includes a second transmission input member rotatably supported in the transmission housing and the first gear of the third gear set is rotatably fixed for common rotation with the second transmission input member and the second transmission input member is concentric with the first transmission input member and at least partially overlaps the first transmission input member and the selective engagement of the second clutch of the dual clutch assembly transfers torque from the clutch housing to the second transmission input member. The transmission further includes a first countershaft rotatably supported within the transmission housing and spaced apart from and parallel with the first and second transmission input members, and the first gear of the first gear set is fixed for common rotation with the first countershaft. The transmission further includes a second countershaft rotatably supported within the transmission housing and spaced apart from and parallel with the first and second transmission input members, and the second gear of the first gear set and the third gear of the fourth gear set are each fixed for common rotation with the second countershaft. The transmission further includes a third countershaft rotatably supported within the transmission housing and spaced apart from and parallel with the first and second transmission input members, and the second gear of the fifth gear set is fixed for common rotation with the third countershaft. The transmission further includes a first countershaft transfer gear selectively connectable to the first countershaft for common rotation with the first countershaft. The transmission further includes a second countershaft transfer gear selectively connectable to the third countershaft for common rotation with the third countershaft wherein the first and second countershaft transfer gears transfer torque to a transmission output member. The transmission further includes a first sleeve shaft rotatably supported in the transmission housing and at least partially overlaps the first countershaft and wherein the second gear of the second gear set and the first gear of the fifth gear set are rotatably fixed for common rotation with the first sleeve shaft, and wherein the second gear of the sixth gear set is selectively connectable for common rotation with the first sleeve shaft. The transmission further includes a second sleeve shaft rotatably supported in the transmission housing and at least partially overlaps the first sleeve and wherein the second gear of the third gear set and the second gear of the fourth gear set are rotatably fixed for common rotation with the second sleeve shaft. The transmission further includes six synchronizer assemblies for selectively coupling at least one of gears of the six gear sets with at least one other of gears of the six gear sets, at least one of the sleeve shafts and the first, second and third countershafts. A first of the six synchronizer assemblies selectively connects the first countershaft transfer gear to the first countershaft. A second of the six synchronizer assemblies selectively connects the second countershaft transfer gear to the third countershaft. A third of the six synchronizer assemblies selectively connects the second gear of the third gear set to the first sleeve shaft. A fourth of the six synchronizer assemblies selectively connects the third gear of the second gear set to third gear of the third gear set. A fifth of the six synchronizer assemblies selectively connects the second gear of the sixth gear set to the first sleeve shaft. A sixth of the six synchronizer assemblies selectively connects the second countershaft to the third countershaft. The selective engagement of the first and second clutches of the dual clutch assembly interconnects the dual clutch housing with at least one of the first and the second transmission input members and the selective engagement of at least one of the six synchronizer assemblies establishes at least one of a plurality of forward and reverse speed ratios.

In another aspect of the present invention the fifth gear set is adjacent the dual clutch assembly, the sixth gear set is adjacent the fifth gear set, the fourth gear set is adjacent the sixth gear set, the third gear set is adjacent the fourth gear set, the second gear set is adjacent the third gear set and the first gear set is disposed between the second gear set and an end wall of the transmission housing.

In another aspect of the present invention the first gear of the fourth gear set and the first gear of the sixth gear set are rotatable about the second input member and connected for common rotation.

DETAILED DESCRIPTION

Figures 1, 2:
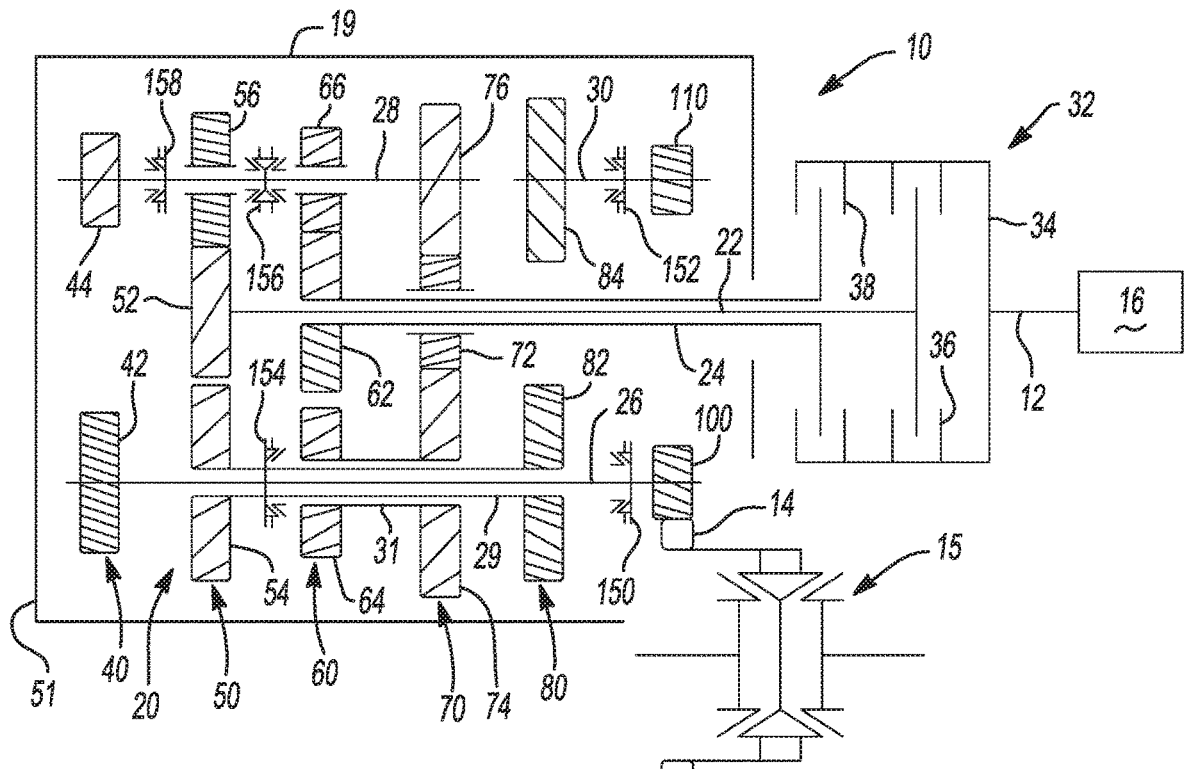
FIG. 1 is a schematic view of an embodiment of a six speed transmission having a dual clutch, two transmission input shafts, two countershafts, two sleeve shafts, a plurality of gear sets and a plurality of synchronizers, in accordance with the present invention.
FIG. 2 is a clutch table illustrating the state of engagement of the dual clutch and each of the plurality of synchronizers for each of the six forward gear ratios and one reverse gear ratio, in accordance with the present invention.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine 16 or other torque producing machine to provide a driving torque to input member 12. The output member or gear 14 rotatably drives a differential assembly 15. The differential assembly transfers torque delivered by output member 14, ultimately, to road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, a second countershaft 28 and a third countershaft 30. Additionally, a first sleeve shaft 29 is concentric with and overlies the first countershaft 26 and a second sleeve shaft 31 is concentric with and overlies first sleeve shaft 29. The second transmission input shaft or member 24 is a hollow shaft that is concentric with and overlies the first transmission input shaft or member 22. The first countershaft 26, the second countershaft 28 and the third countershaft 30 are each spaced apart from and parallel with the first and second transmission input shaft members 22, 24. The first and second transmission input shafts 22, 24 define a first axis of rotation, the first countershaft 26 defines a second axis of rotation and the second and third countershafts 28, 30 defines a third axis of rotation. The position and location of countershafts 26, 28 and 30 relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that the dual clutch assembly 32 shown throughout the Figures may be a wet or dry clutch assembly without departing from the scope of the present invention.

The gearing arrangement 20 also includes a plurality of co-planar, meshing gear sets 40, 50, 60, 70 and 80. The present invention contemplates that the plurality of co-planar, meshing gear sets 40, 50, 60, 70 and 80 may be arranged axially along transmission input shafts 22, 24 in an order other than that which is shown in FIG. 1 and still be within the scope of the invention. Co-planar gear set 40 includes a first pinion gear 42 and a second pinion gear 44. First pinion gear 42 is rotatably fixed and connected for common rotation with the first countershaft 26. Second pinion gear 44 is rotatably fixed and connected for common rotation with the second countershaft 28 and meshes with first pinion gear 42. It should be appreciated that first pinion gear 42 may be a separate gear structure fixed to the first countershaft 26 or gear teeth/splines formed on an outer surface of the first countershaft 26 without departing from the scope of the present invention. Likewise, it should also be appreciated that second pinion gear 44 may be a separate gear structure fixed to the second countershaft 28 or gear teeth/splines formed on an outer surface of the second countershaft 28 without departing from the scope of the present invention. Gear set 40 is disposed adjacent a wall 51 of the transmission housing 19 on the opposite side of the transmission relative to the dual clutch assembly 32.

Co-planar gear set 50 includes a first pinion gear 52, a second pinion gear 54 and a third pinion gear 56. First pinion gear 52 is rotatably fixed and connected for common rotation with the first transmission input shaft member 22 and meshes with third pinion gear 56. Second pinion gear 54 is rotatably fixed and connected for common rotation with the first sleeve shaft 29. Third pinion gear 56 is freely rotatable about second countershaft 28 and meshes with second pinion gear 54. Gear set 50 is positioned axially adjacent gear set 40.

Co-planar gear set 60 includes a first pinion gear 62, a second pinion gear 64 and a third pinion gear 66. First pinion gear 62 is rotatably fixed and connected for common rotation with the second transmission input shaft member 24 and meshes with third pinion gear 66. Second pinion gear 64 is rotatably fixed and connected for common rotation with the second sleeve shaft 31. Third pinion gear 66 is freely rotatable about second countershaft 28 and meshes with second pinion gear 64. Gear set 60 is disposed adjacent gear set 50.

Co-planar gear set 70 includes a first pinion gear 72, a second pinion gear 74 and a third pinion gear 76. First pinion gear 72 is freely rotatable about the second transmission input shaft member 24 and meshes with the second pinion gear 74 and the third pinion gear 76. Second pinion gear 74 is rotatably fixed and connected for common rotation with the second sleeve shaft 31. The third pinion gear 76 is rotatably fixed and connected for common rotation with the second countershaft 28. Gear set 70 is positioned adjacent gear set 60.

Co-planar gear set 80 includes a first pinion gear 82 and a second pinion gear 84. First pinion gear 82 is rotatably fixed and connected for common rotation with the first sleeve shaft 29 and meshes with second pinion gear 84. Second pinion gear 84 is rotatably fixed and connected for common rotation with the third countershaft member 30. Gear set 80 is positioned adjacent gear set 70.

Further, a first countershaft transfer gear 100 is selectively connectable for common rotation with the first countershaft member 26. A second countershaft transfer gear 110 is selectively connectable for common rotation with the third countershaft member 30. First countershaft transfer gear 100 is configured to mesh with output member 14 and the second countershaft transfer gear 110 is configured to mesh with output member 14. However, the first countershaft transfer gear 100 and the second countershaft transfer gear 110 do not mesh with each other.

A park gear (not shown) may be provided for placing transmission 10 in a park mode that prevents output member 14 from rotating. The park gear may be rotationally fixed to the first, second or third countershaft members 26, 28 and 30. However, the axial location of the park gear along the first, second or third countershaft members 26, 28 or 30 may be altered in accordance with available packaging space.

With continued reference to FIG. 1, the transmission 10 further includes a plurality of selectively engageable synchronizer assemblies 150, 152, 154, 156 and 158. Synchronizers 150, 152, 154, 156 and 158 and are single sided synchronizers and generally include a shift fork (not shown) that is bi-directionally translated by an actuator (not shown) into at least one engaged position and a neutral or disengaged position. In the present embodiment, synchronizer 150 is selectively actuatable to connect the first countershaft transfer gear 100 for common rotation with the first countershaft member 26. Synchronizer 152 is selectively actuatable to connect for common rotation the second countershaft transfer gear 110 with the third countershaft member 30. Synchronizer 154 is selectively actuatable to connect for common rotation the first sleeve shaft 29 with the second sleeve shaft 31. Synchronizer 156 is selectively actuatable to connect for common rotation the third pinion 56 of gear set 50 with the third pinion 66 of gear set 60. Synchronizer 158 is selectively actuatable to connect for common rotation the third pinion 56 of gear set 50 with the second countershaft member 28.

The transmission 10 is capable of transmitting torque from the input shaft 12 to the output gear member 14 in at least six forward torque ratios and at least one reverse torque ratio. Each of the forward torque ratios and the reverse torque ratio is attained by selective engagement of the dual clutch assembly 32 and one or more of the synchronizer assemblies 150, 152, 154, 156 and 158. Those skilled in the art will readily understand that a different speed ratio is associated with each torque ratio.

It should also be appreciated that each individual gear set or combinations of gear sets 40, 50, 60, 70 and 80 provides one or more forward and/or reverse gear ratios upon selective engagement of the synchronizer assemblies 150, 152, 154, 156 and 158. Moreover, it should be appreciated that a particular forward or reverse speed ratio may be achieved by different combinations of synchronizer and associated gear sets without departing from the scope of the present invention.

Referring now to FIG. 2, a truth table or clutching chart illustrates the state of engagement for the dual clutch 32 and the synchronizers 150, 152, 154, 156 and 158. An "X" in the box means that the particular clutch or synchronizer is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, to establish the reverse torque ratio, clutch element 36 is engaged and synchronizers 150 and 158 are activated. Clutch element 36 couples the input member 12 with the first transmission input shaft member 22. Synchronizer 150 connects the first countershaft transfer gear 100 to the first countershaft member 26. Synchronizer 158 connects the third pinion 56 of gear set 50 with the second countershaft member 28. More specifically, input torque from the input shaft 12 is transferred through the dual clutch assembly 32 to the first transmission input shaft member 22, from transmission input shaft member 22 to gear 52, from gear 52 to gear 56, from gear 56 to synchronizer 158, from synchronizer 158 to second countershaft member 28, from second countershaft member 28 to gear 44, from gear 44 to gear 42, from gear 42 to first countershaft member 26, from first countershaft member 26 to synchronizer 150, from synchronizer 150 to first countershaft transfer gear 100 and from first countershaft transfer gear 100 to the output member 14.

To establish a first forward torque ratio (i.e. a 1st gear), clutch element 36 is engaged and synchronizers 150 and 156 are activated. Clutch element 36 couples the input member 12 with the first transmission input shaft member 22. Synchronizer 150 connects the first countershaft transfer gear 100 to the first countershaft member 26. Synchronizer 156 connects the third pinion 56 of the second gear set 50 to the third pinion 66 of third gear set 60. More specifically, input torque from the input shaft 12 is transferred through the dual clutch assembly 32 to the first transmission input shaft member 22, from transmission input shaft member 22 to gear 52, from gear 52 to gear 56, from gear 56 to synchronizer 156, from synchronizer 156 to gear 66, from gear 66 to gear 64, from gear 64 to second sleeve shaft 31, from second sleeve shaft 31 to gear 74, from gear 74 to gear 72, from gear 72 to gear 76, from gear 76 to gear 44, from gear 44 to gear 42, from gear 42 to first countershaft member 26, from first countershaft member 26 to synchronizer 150, from synchronizer 150 to first countershaft transfer gear 100 and from first countershaft transfer gear 100 to the output member 14.

To establish a second forward torque ratio (i.e. a 2nd gear), clutch element 38 is engaged and synchronizers 150 and 154 are activated. Clutch element 38 couples the input member 12 with the second transmission input shaft member 24. Synchronizer 150 the first countershaft transfer gear 100 to the first countershaft member 26. Synchronizer 154 connects the second gear 54 of gear set 50 to second gear 64 of gear set 60. More specifically, input torque from the input shaft 12 is transferred through the dual clutch assembly 32 to the second transmission input shaft member 24 to gear 62, from gear 62 to gear 66, from gear 66 to gear 64, from gear 64 to synchronizer 154 and second sleeve shaft 31, from second sleeve shaft 31 to gear 74, from gear 74 to gear 72, from gear 72 to gear 76, from gear 76 to second countershaft member 28, from second countershaft member 28 to gear 44, from gear 44 to gear 42, from gear 42 to first countershaft 26, from first countershaft 26 to synchronizer 150, from synchronizer 150 to first countershaft transfer gear 100 and from first countershaft transfer gear 100 to the output member 14.

To establish a third forward torque ratio (i.e. a 3rd gear), clutch element 36 is engaged and synchronizers 150 and 154 are activated. Clutch element 36 couples the input member 12 to the first transmission input shaft member 22 which rotates pinion 52. Synchronizer 150 connects the first countershaft transfer gear 100 to the first countershaft member 26. Synchronizer 154 connects the second gear 54 of gear set 50 to second gear 64 of gear set 60. More specifically, input torque from the input shaft 12 is transferred through the dual clutch assembly 32 to the first transmission input shaft member 22 to gear 52, from gear 52 to gear 56, from gear 56 to gear 54, from gear 54 to synchronizer 154, from synchronizer 154 to gear 64, from gear 64 to second sleeve shaft 31, from second sleeve shaft 31 to gear 74, from gear 74 to gear 72, from gear 72 to gear 76, from gear 76 to second countershaft member 28, from second countershaft member 28 to gear 44, from gear 44 to gear 42, from gear 42 to first countershaft 26, from first countershaft 26 to synchronizer 150, from synchronizer 150 to first countershaft transfer gear 100 and from first countershaft transfer gear 100 to the output member 14.

To establish a fourth forward torque ratio (i.e. a 4th gear), clutch element 38 is engaged and synchronizers 152 and 154 are activated. Clutch element 38 couples the input member 12 with the second transmission input shaft member 24. Synchronizer 152 connects the second countershaft transfer shaft gear 110 to third countershaft member 30. Synchronizer 154 connects the second gear 54 of gear set 50 to second gear 64 of gear set 60. More specifically, input torque from the input shaft 12 is transferred through the dual clutch assembly 32 to the second transmission input shaft member 24 to gear 62, from gear 62 to gear 66, from gear 66 to gear 64, from gear 64 to synchronizer 154, from synchronizer 154 to gear 54, from gear 54 to first sleeve shaft 29, from first sleeve shaft 29 to gear 82, from gear 82 to gear 84, from gear 84 to third countershaft member 30, from third countershaft member 30 to synchronizer 152, from synchronizer 152 to second countershaft transfer gear 110 and from second countershaft transfer gear 110 to the output member 14.

To establish a fifth forward torque ratio (i.e. a 5th gear), clutch element 36 is engaged and synchronizers 152 and 156 are activated. Clutch element 36 couples the input member 12 with the first transmission input shaft member 22. Synchronizer 152 connects the second countershaft transfer gear 110 to third countershaft member 30. Synchronizer 156 connects the third pinion 56 of the second gear set 50 to the third pinion 66 of third gear set 60. More specifically, input torque from the input shaft 12 is transferred through the dual clutch assembly 32 to the first transmission input shaft member 22 and to gear 52, from gear 52 to gear 56, from gear 56 to 54, from gear 54 to first sleeve shaft 29, from first sleeve shaft 29 to gear 82, from gear 82 to gear 84, from gear 84 to the third countershaft member 30, from third countershaft member 30 to synchronizer 152, from synchronizer 152 to second countershaft transfer gear 110 and from second countershaft transfer gear 110 to the output member 14.

To establish a sixth forward torque ratio (i.e. a 6th gear), clutch element 38 is engaged and synchronizers 152 and 156 are activated. Clutch element 38 couples the input member 12 with the second transmission input shaft member 24. Synchronizer 152 connects the second countershaft transfer gear 110 to third countershaft member 30. Synchronizer 156 connects the third pinion 56 of the second gear set 50 to the third pinion 66 of third gear set 60. More specifically, input torque from the input shaft 12 is transferred through the dual clutch assembly 32 to the second transmission input shaft member 24 and to gear 62, from gear 62 to gear 66, from gear 66 to synchronizer 156, from synchronizer 156 to gear 56, from gear 56 to gear 54, from gear 54 to first sleeve shaft 29, from first sleeve shaft 29 to gear 82, from gear 82 to gear 84, from gear 84 to third countershaft member 30, from third countershaft member 30 to synchronizer 152, from synchronizer 152 to second countershaft transfer gear 110, from transfer gear 110 to the output member 14.

Again, it should be appreciated that any one of the gear sets of gear sets 40, 50, 60, 70 and 80 may be changed in size and number gear teeth or gear pitch to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, an additional gear set 90 and an additional synchronizer 160 may be added to the six speed transmission 10 of FIG. 1 to produce a transmission 200 having eight forward speeds and one reverse speed as illustrated in FIG. 3.

Figures 3, 4:
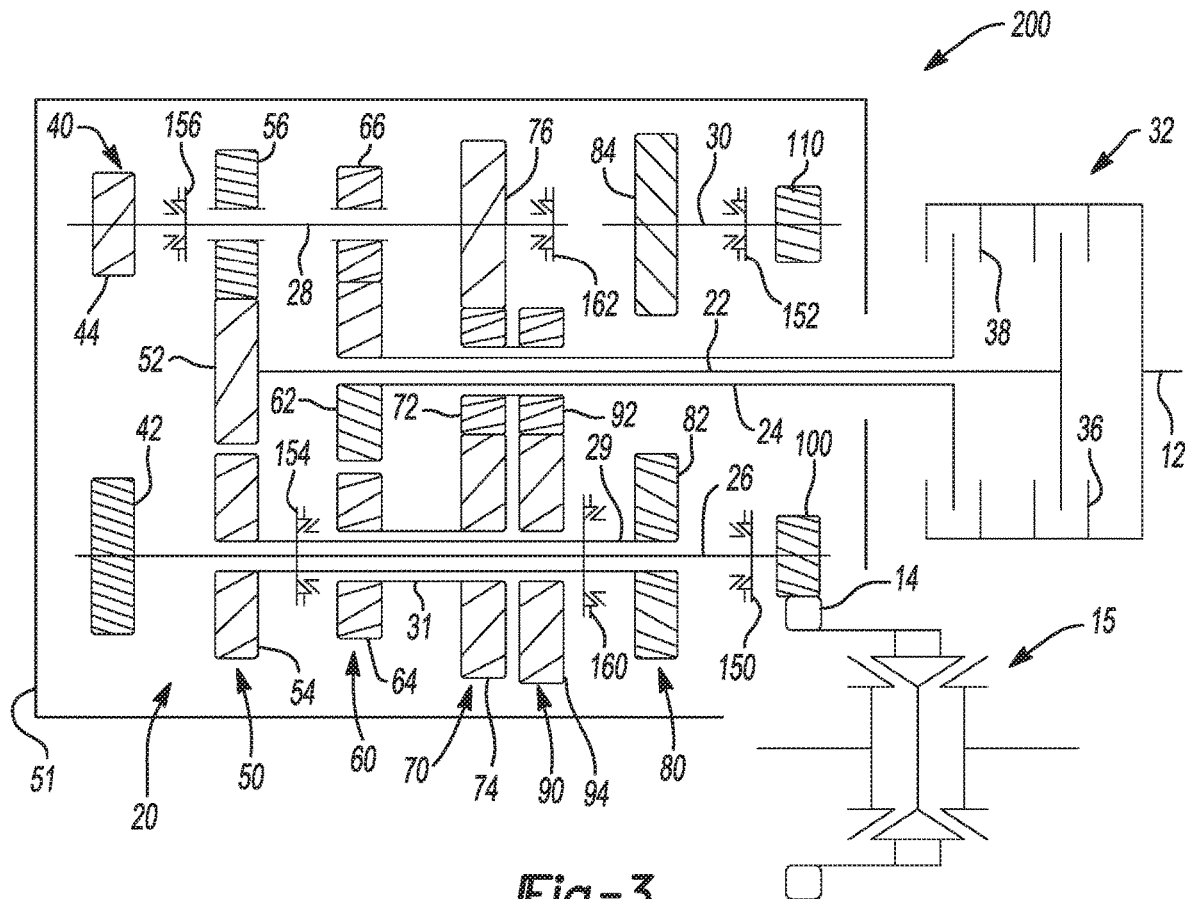
FIG. 3 is a schematic view of an embodiment of an eight speed transmission having a dual clutch, two transmission input shafts, two countershafts, two sleeve shafts, a plurality of gear sets and a plurality of synchronizers, in accordance with the present invention.
FIG. 4 is a clutch table illustrating the state of engagement of the dual clutch and each of the plurality of synchronizers for each of the eight forward gear ratios and one reverse gear ratio, in accordance with the present invention.

With continuing reference to FIG. 3, an eight speed dual clutch transmission is illustrated, in accordance with the present invention. The eight speed transmission 200 has the same components as described above and as indicated by like reference numbers depicting like components, as shown in FIG. 1. However, transmission 200 has an additional gear set 90 and two additional synchronizers 160 and 162. Synchronizers 158 is not present in transmission 200 of FIG. 3. Gear set 90 includes a first gear 92 in mesh with a second gear 94. Gear 92 is rotatable about the second transmission input shaft member 24 and connected for common rotation with gear 72. Gear 94 is selectively connectable for common rotation with first sleeve shaft 29. Synchronizer 160 is selectively actuatable to connect for common rotation second pinion 94 of gear set 90 with the first sleeve shaft 29. Synchronizer 162 is selectively actuatable to connect for common rotation the second countershaft member 28 with the third countershaft member 30.

Referring now to FIG. 4, a truth table or clutching chart illustrates the state of engagement for the dual clutch 32 and the synchronizers 150, 152, 154, 156, 160 and 162. An "X" in the box means that the particular clutch or synchronizer is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 200. Of course, other gear ratios are achievable depending on the gear diameter, gear teeth count and gear configuration selected.

For example, to establish the reverse torque ratio, clutch element 38 is engaged and synchronizers 152 and 162 are activated. Clutch element 38 couples the input member 12 with the second transmission input shaft member 24. Synchronizer 152 connects for common rotation the second countershaft transfer gear 110 with the third countershaft member 30. Synchronizer 162 connects for common rotation the second countershaft member 28 with the third countershaft member 30. More specifically, input torque from the input shaft 12 is transferred through the dual clutch assembly 32 to the second transmission input shaft member 24, from second transmission input shaft member 24 to gear 62, from gear 62 to gear 66, from gear 66 to gear 64, from gear 64 to gear 74, from gear 74 to gear 72, from gear 72 to gear 76, from gear 76 to second countershaft member 28, from second countershaft member 28 to synchronizer 162, from synchronizer 162 to third countershaft member 30, from third countershaft member 30 to synchronizer 152, from synchronizer 152 to second countershaft transfer gear 110 and from second countershaft transfer gear 110 to the output member 14.

With continuing reference to FIG. 4, first, second and third gear ratios are established as described above with respect to transmission 10 and the truth table of FIG. 2. Moreover, the torque transmission through transmission 200 is also as described above with reference to transmission 10 and the truth table of FIG. 2.

To establish a fourth forward torque ratio (i.e. a 4th gear), clutch element 38 is engaged and synchronizers 152 and 160 are activated. Clutch element 38 couples the input member 12 with the second transmission input shaft member 24. Synchronizer 152 connects the second countershaft transfer shaft gear 110 to third countershaft member 30. Synchronizer 160 connects the second gear 94 of gear set 90 to shaft 29. More specifically, input torque from the input shaft 12 is transferred through the dual clutch assembly 32 to the second transmission input shaft member 24 to gear 62, from gear 62 to gear 66, from gear 66 to gear 64, from gear 64 to gear 74, from gear 74 to gear 72, from gear 72 to gear 92, from gear 92 to gear 94, from gear 94 to synchronizer 160, from synchronizer 160 to first sleeve shaft 29, from first sleeve shaft 29 to gear 82, from gear 82 to gear 84, from gear 84 to third countershaft member 30, from third countershaft member 30 to synchronizer 152, from synchronizer 152 to second countershaft transfer gear 110 and from second countershaft transfer gear 110 to the output member 14.

To establish a fifth forward torque ratio (i.e. a 5th gear), clutch element 36 is engaged and synchronizers 150 and 160 are activated. Clutch element 36 couples the input member 12 with the first transmission input shaft member 22. Synchronizer 150 connects the first countershaft transfer gear 100 to first countershaft member 26. Synchronizer 160 connects the second gear 94 of gear set 90 to shaft 29. More specifically, input torque from the input shaft 12 is transferred through the dual clutch assembly 32 to the first transmission input shaft member 22 and to gear 52, from gear 52 to gear 56, from gear 56 to gear 54, from gear 54 to first sleeve shaft 29, from first sleeve shaft 29 to synchronizer 160, from synchronizer 160 to gear 94, from gear 94 to gear 92, from gear 92 to gear 72, from gear 72 to gear 76, from gear 76 to second countershaft 28, from second countershaft 28 to gear 44, from gear 44 to gear 42, from gear 42 to the first countershaft member 26, from first countershaft member 26 to synchronizer 150, from synchronizer 150 to first countershaft transfer gear 100 and from first countershaft transfer gear 100 to the output member 14.

To establish a sixth forward torque ratio (i.e. a 6th gear), clutch element 38 is engaged and synchronizers 152 and 154 are activated. Clutch element 38 couples the input member 12 with the second transmission input shaft member 24. Synchronizer 152 connects the second countershaft transfer shaft gear 110 to third countershaft member 30. Synchronizer 154 connects the second gear 54 of gear set 50 to second gear 64 of gear set 60. More specifically, input torque from the input shaft 12 is transferred through the dual clutch assembly 32 to the second transmission input shaft member 24 to gear 62, from gear 62 to gear 66, from gear 66 to gear 64, from gear 64 to synchronizer 154, from synchronizer 154 to first sleeve shaft 29, from first sleeve shaft 29 to gear 82, from gear 82 to gear 84, from gear 84 to third countershaft member 30, from third countershaft member 30 to synchronizer 152, from synchronizer 152 to second countershaft transfer gear 110 and from second countershaft transfer gear 110 to the output member 14.

To establish a seventh forward torque ratio (i.e. a 7th gear), clutch element 36 is engaged and synchronizers 152 and 160 are activated. Clutch element 36 couples the input member 12 with the first transmission input shaft member 22. Synchronizer 152 connects the second countershaft transfer gear 110 to third countershaft member 30. Synchronizer 160 connects the second gear 94 of gear set 90 to first sleeve shaft 29. More specifically, input torque from the input shaft 12 is transferred through the dual clutch assembly 32 to the first transmission input shaft member 22 and to gear 52, from gear 52 to gear 56, from gear 56 to gear 54, from gear 54 to first sleeve shaft 29, from first sleeve shaft 29 to gear 82, from gear 82 to gear 84, from gear 84 to third countershaft member 30, from third countershaft member 30 to synchronizer 152, from synchronizer 152 to second countershaft transfer gear 110 and from second countershaft transfer gear 110 to the output member 14.

To establish an eighth forward torque ratio (i.e. an 8th gear), clutch element 38 is engaged and synchronizers 152 and 156 are activated. Clutch element 38 couples the input member 12 with the second transmission input shaft member 24. Synchronizer 152 connects the second countershaft transfer gear 110 to third countershaft member 30. Synchronizer 156 connects the third pinion 56 of the second gear set 50 to the third pinion 66 of third gear set 60. More specifically, input torque from the input shaft 12 is transferred through the dual clutch assembly 32 to the second transmission input shaft member 24 and to gear 62, from gear 62 to gear 66, from gear 66 to synchronizer 156, from synchronizer 156 to gear 56, from gear 56 to gear 54, from gear 54 to first sleeve shaft 29, from first sleeve shaft 29 to gear 82, from gear 82 to gear 84, from gear 84 to third countershaft member 30, from third countershaft member 30 to synchronizer 152, from synchronizer 152 to second countershaft transfer gear 110, from transfer gear 110 to the output member 14.

While the best modes for carrying out the invention have been described in detail, those familiar with the art to which this invention relates will recognize various alternative designs and embodiments for practicing the invention within the scope of the appended claims.

What is claimed is:

1. A transmission comprising:
   a transmission housing;
   a dual clutch assembly having a first clutch, a second clutch and a clutch housing connectable to an engine output member, wherein the clutch housing is rotationally supported within the transmission housing;
   a first, second, third, fourth, fifth and sixth gear set, wherein the first gear set includes a first gear in mesh with a second gear, the second gear set includes a first gear, a second gear, and a third gear, wherein the first gear is in mesh with the third pear, and the second gear is in mesh with the third gear, the third gear set includes a first gear, a second gear, and a third gear, wherein the first gear is in mesh with the third gear, and the second gear is in mesh with the third gear, the fourth gear set includes a first gear in mesh with a second gear and a third gear, the fifth gear set includes a first gear in mesh with a second gear and the sixth gear set includes a first gear in mesh with a second gear;
   a first transmission input member rotatably supported in the transmission housing and wherein the first gear of the second gear set is rotatably fixed for common rotation with the first transmission input member and wherein the selective engagement of the first clutch of the dual clutch assembly transfers torque from the clutch housing to the first transmission input member;
   a second transmission input member rotatably supported in the transmission housing and wherein the first gear of the third gear set is rotatably fixed for common rotation with the second transmission input member and wherein the second transmission input member is concentric with the first transmission input member and at least partially overlaps the first transmission input member and wherein the selective engagement of the second clutch of the dual clutch assembly transfers torque from the clutch housing to the second transmission input member;
   a first countershaft rotatably supported within the transmission housing and spaced apart from and parallel with the first and second transmission input members, wherein the first gear of the first gear set is fixed for common rotation with the first countershaft;
   a second countershaft rotatably supported within the transmission housing and spaced apart from and parallel with the first and second transmission input members, wherein the second gear of the first gear set and the third gear of the fourth gear set are each fixed for common rotation with the second countershaft;
   a third countershaft rotatably supported within the transmission housing and spaced apart from and parallel with the first and second transmission input members, wherein the second gear of the fifth gear set is fixed for common rotation with the third countershaft;
   a first countershaft transfer gear selectively connectable to the first countershaft for common rotation with the first countershaft;
   a second countershaft transfer gear selectively connectable to the third countershaft for common rotation with the third countershaft wherein the first and second countershaft transfer gears transfer torque to a transmission output member;
   a first sleeve shaft rotatably supported in the transmission housing and at least partially overlapping the first countershaft and wherein the second gear of the second gear set and the first gear of the fifth gear set are rotatably fixed for common rotation with the first sleeve shaft, and wherein the second gear of the sixth gear set is selectively connectable for common rotation with the first sleeve shaft;
   a second sleeve shaft rotatably supported in the transmission housing and at least partially overlapping the first sleeve shaft and wherein the second gear of the third gear set and the second gear of the fourth gear set are rotatably fixed for common rotation with the second sleeve shaft; and
   six synchronizer assemblies for selectively coupling at least one of gears of the six gear sets with at least one other of gears of the six gear sets, at least one of the sleeve shafts and the first, second and third countershafts, and
   wherein the selective engagement of the first and second clutches of the dual clutch assembly interconnects the dual clutch housing with at least one of the first and the second transmission input members and the selective engagement of at least one of the six synchronizer assemblies establishes at least one of a plurality of forward and reverse speed ratios.

2. The transmission of claim 1 wherein a first of the six synchronizer assemblies selectively connects the first countershaft transfer gear to the first countershaft.

3. The transmission of claim 2 wherein a second of the six synchronizer assemblies selectively connects the second countershaft transfer gear to the third countershaft.

4. The transmission of claim 3 wherein a third of the six synchronizer assemblies selectively connects the second gear of the third gear set to the first sleeve shaft.

5. The transmission of claim 4 wherein a fourth of the six synchronizer assemblies selectively connects the third gear of the second gear set to third gear of the third gear set.

6. The transmission of claim 5 wherein a fifth of the six synchronizer assemblies selectively connects the second gear of the sixth gear set to the first sleeve shaft.

7. The transmission of claim 6 wherein a sixth of the six synchronizer assemblies selectively connects the second countershaft to the third countershaft.

8. The transmission of claim 1 wherein the fifth gear set is adjacent the dual clutch assembly, the sixth gear set is adjacent the fifth gear set, the fourth gear set is adjacent the sixth gear set, the third gear set is adjacent the fourth gear set, the second gear set is adjacent the third gear set and the first gear set is disposed between the second gear set and an end wall of the transmission housing.

9. The transmission of claim 1 wherein the six synchronizer assemblies include includes a first synchronizer assembly for selectively connecting the first countershaft transfer gear to the first countershaft and a fourth synchronizer assembly for selectively connecting the third gear of the second gear set to the third gear of the third gear set to establish a first gear ratio when the first clutch of the dual clutch is engaged to connect the dual clutch housing to the first transmission input member.

10. The transmission of claim 1 wherein the six synchronizer assemblies include a first synchronizer assembly for selectively connecting the first countershaft transfer gear to the first countershaft and a third synchronizer assembly for selectively connecting the second gear of the second gear set to second gear of the third gear set to establish a second gear ratio when the second clutch of the dual clutch is engaged to connect the dual clutch housing to the second transmission input member.

11. The transmission of claim 1 wherein the six synchronizer assemblies include a first synchronizer assembly for selectively connecting the first countershaft transfer gear to the first countershaft and a third synchronizer assembly for selectively connecting the second gear of the second gear set to second gear of the third gear set to establish a third gear ratio when the first clutch of the dual clutch is engaged to connect the dual clutch housing to the first transmission input member.

12. The transmission of claim 1 wherein the six synchronizer assemblies include a second synchronizer assembly for selectively connecting the second countershaft transfer gear to the third countershaft and a fifth synchronizer assembly for selectively connecting the second gear of the sixth gear set to first gear of the fifth gear set to establish a fourth gear ratio when the second clutch of the dual clutch is engaged to connect the dual clutch housing to the first transmission input member.

13. The transmission of claim 1 wherein the six synchronizer assemblies include a first synchronizer assembly for selectively connecting the first countershaft transfer gear to the first countershaft and a fifth synchronizer assembly for selectively connecting the second gear of the sixth gear set to the second gear of the first gear set to establish a fifth gear ratio when the first clutch of the dual clutch is engaged to connect the dual clutch housing to the first transmission input member.

14. The transmission of claim 1 wherein the six synchronizer assemblies include a second synchronizer assembly for selectively connecting the second countershaft transfer gear to the third countershaft and a third synchronizer assembly for selectively connecting the second gear of the second gear set to the second gear of the third gear set to establish a sixth gear ratio when the second clutch of the dual clutch is engaged to connect the dual clutch housing to the first transmission input member.

15. The transmission of claim 1 wherein the six synchronizer assemblies include a second synchronizer assembly for selectively connecting the second countershaft transfer gear to the third countershaft and a fifth synchronizer assembly for selectively connecting the second gear of the sixth gear set to the first gear of the fifth gear set to establish a seventh gear ratio when the first clutch of the dual clutch is engaged to connect the dual clutch housing to the first transmission input member.

16. The transmission of claim 1 wherein the six synchronizer assemblies include a second synchronizer assembly for selectively connecting the second countershaft transfer gear to the third countershaft and a fourth synchronizer assembly for selectively connecting the third gear of the second gear set to the third gear of the third gear set to establish an eighth gear ratio when the second clutch of the dual clutch is engaged to connect the dual clutch housing to the first transmission input member.

17. The transmission of claim 1 wherein the six synchronizer assemblies include a second synchronizer assembly for selectively connecting the second countershaft transfer gear to the third countershaft and a sixth synchronizer assembly for selectively connecting the second countershaft to the third countershaft to establish a reverse gear ratio when the second clutch of the dual clutch is engaged to connect the dual clutch housing to the first transmission input member.

18. A transmission comprising:
a transmission housing;
a dual clutch assembly having a first clutch, a second clutch and a clutch housing connectable to an engine output member, wherein the clutch housing is rotationally supported within the transmission housing;
a first, second, third, fourth, fifth and sixth gear set, wherein the first gear set includes a first gear in mesh with a second gear, the second gear set includes a first gear, a second gear, and a third gear, wherein the first gear is in mesh with the third gear, and the second gear is in mesh with the third gear, the third gear set includes a first gear, a second gear, and a third gear, wherein the first gear is in mesh with the third gear, and the second gear is in mesh with a third gear, the fourth gear set includes a first gear in mesh with a second gear and a third gear, the fifth gear set includes a first gear in mesh with a second gear and the sixth gear set includes a first gear in mesh with a second gear;
a first transmission input member rotatably supported in the transmission housing and wherein the first gear of the second gear set is rotatably fixed for common rotation with the first transmission input member and wherein the selective engagement of the first clutch of the dual clutch assembly transfers torque from the clutch housing to the first transmission input member;

a second transmission input member rotatably supported in the transmission housing and wherein the first gear of the third gear set is rotatably fixed for common rotation with the second transmission input member and wherein the second transmission input member is concentric with the first transmission input member and at least partially overlaps the first transmission input member and wherein the selective engagement of the second clutch of the dual clutch assembly transfers torque from the clutch housing to the second transmission input member;

a first countershaft rotatably supported within the transmission housing and spaced apart from and parallel with the first and second transmission input members, wherein the first gear of the first gear set is fixed for common rotation with the first countershaft;

a second countershaft rotatably supported within the transmission housing and spaced apart from and parallel with the first and second transmission input members, wherein the second gear of the first gear set and the third gear of the fourth gear set are each fixed for common rotation with the second countershaft;

a third countershaft rotatably supported within the transmission housing and spaced apart from and parallel with the first and second transmission input members, wherein the second gear of the fifth gear set is fixed for common rotation with the third countershaft;

a first countershaft transfer gear selectively connectable to the first countershaft for common rotation with the first countershaft;

a second countershaft transfer gear selectively connectable to the third countershaft for common rotation with the third countershaft wherein the first and second countershaft transfer gears transfer torque to a transmission output member;

a first sleeve shaft rotatably supported in the transmission housing and at least partially overlaps the first countershaft and wherein the second gear of the second gear set and the first gear of the fifth gear set are rotatably fixed for common rotation with the first sleeve shaft, and wherein the second gear of the sixth gear set is selectively connectable for common rotation with the first sleeve shaft;

a second sleeve shaft rotatably supported in the transmission housing and at least partially overlaps the first sleeve shaft and wherein the second gear of the third gear set and the second gear of the fourth gear set are rotatably fixed for common rotation with the second sleeve shaft; and six synchronizer assemblies for selectively coupling at least one of gears of the six gear sets with at least one other of gears of the six gear sets, at least one of the sleeve shafts and the first, second and third countershafts, and wherein a first of the six synchronizer assemblies selectively connects the first countershaft transfer gear to the first countershaft;

a second of the six synchronizer assemblies selectively connects the second countershaft transfer gear to the third countershaft;

a third of the six synchronizer assemblies selectively connects the second gear of the third gear set to the first sleeve shaft;

a fourth of the six synchronizer assemblies selectively connects the third gear of the second gear set to third gear of the third gear set;

a fifth of the six synchronizer assemblies selectively connects the second gear of the sixth gear set to the first sleeve shaft;

a sixth of the six synchronizer assemblies selectively connects the second countershaft to the third countershaft; and wherein the selective engagement of the first and second clutches of the dual clutch assembly interconnects the dual clutch housing with at least one of the first and the second transmission input members and the selective engagement of at least one of the six synchronizer assemblies establishes at least one of a plurality of forward and reverse speed ratios.

19. The transmission of claim 18 wherein the fifth gear set is adjacent the dual clutch assembly, the sixth gear set is adjacent the fifth gear set, the fourth gear set is adjacent the sixth gear set, the third gear set is adjacent the fourth gear set, the second gear set is adjacent the third gear set and the first gear set is disposed between the second gear set and an end wall of the transmission housing.

20. The transmission of claim 19 wherein the first gear of the fourth gear set and the first gear of the sixth gear set are rotatable about the second input member and connected for common rotation.

* * * * *